June 30, 1942.   R. L. DODGE   2,287,767
BEARING SETTING INSTRUMENT
Filed March 25, 1940
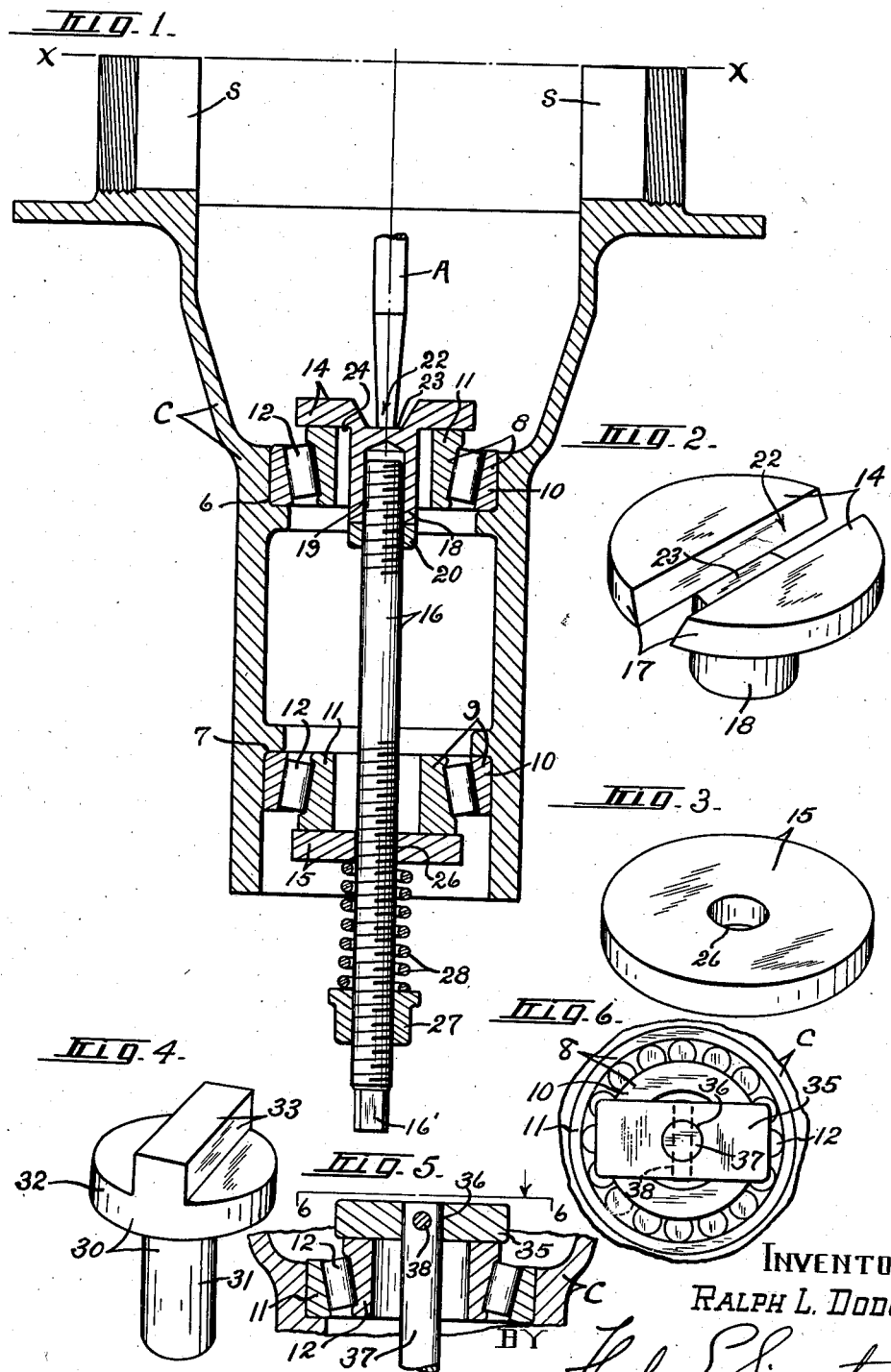
INVENTOR
RALPH L. DODGE
BY Theodore L. Simonton
ATTORNEY Patented June 30, 1942

2,287,767

UNITED STATES PATENT OFFICE 2,287,767

BEARING SETTING INSTRUMENT

Ralph L. Dodge, Syracuse, N. Y., assignor to New Process Gear Corporation, Syracuse, N. Y., a corporation of Delaware Application March 25, 1940, Serial No. 325,817

1 Claim. (Cl. 29—85)

This invention relates to a bearing setting instrument and pertains more particularly to a device for firmly and accurately setting the rolling bearings of the drive pinions of differential gearings connected with the drive axles of motor vehicles.

In many differential gear structures, shims are employed to position and maintain the drive pinions in proper running relation with the ring gears. When replacing the drive pinions of such differential gear structures, the thickness of the shims are preferably determined prior to mounting the pinion in the carrier therefor. This is often accomplished by measuring with a gauge the distance from the axis of rotation of the ring gear of the differential to the surface of the bearing engaged by the shims. The thickness of the shim required is then determined by deducting from the measurement thus obtained the sum obtained by adding the axial length of the pinion head to the proper distance the pinion is to be spaced from the axis of the ring gear. This distance of the pinion from the axis of the ring gear is determined by the manufacturer and usually stamped on the head of the pinion. Before making the measurement with the gauge the bearing for the pinion is manually placed in the carrier of the differential and it very often occurs that the bearing is not properly seated. The measurement obtained with the gauge when the bearing is not properly seated is consequently not accurate. This results in the thickness of the shims being inaccurately determined and an improper mounting of the drive pinion.

An object of this invention is to provide an instrument by which the rolling bearings of drive pinions of differential gearings may be quickly and accurately seated in the differential carrier prior to assembling the bearings with the drive pinion.

Another object of the invention resides in providing an instrument of the above mentioned class which is simple, durable and inexpensive in construction and which is adapted to be used with the various models of differential gearings now in common use.

These objects are attained by mechanism illustrated in the accompanying drawing, in which:

Figure 1 is a vertical sectional view illustrating a bearing seating instrument embodying the various features of this invention operatively associated with the bearings for a differential drive pinion mounted in a carrier.

Figure 2 is a perspective view of a pressure element or head adapted to operatively engage an end of one of the bearings of the differential drive pinion.

Figure 3 is a perspective view of a second pressure element or plate adapted to engage the end of a second bearing member of the differential drive pinion.

Figure 4 is a perspective view showing a modified form of pressure head.

Figure 5 is a detail longitudinal sectional view illustrating a still further modified form of pressure head.

Figure 6 is a detail sectional view taken on line 6—6, Figure 5, illustrating the pressure head in plan view.

In Figure 1 there is shown a differential carrier C of conventional construction, having spaced seats S for the side bearings of the differential and two spaced seats 6 and 7 arranged in right angular relation with the seats S for receiving the bearings, as 8 and 9, for the drive pinion (not shown). The bearings 8 and 9 are of the usual taper roll type and are shown mounted in the seats 6 and 7, respectively. Each of these bearings comprises an outer bearing race or cup 10, an inner bearing race or cone 11 and a plurality of rollers 12 interposed between said race members.

The instrument of this invention comprises a pair of pressure elements 14 and 15 and a spindle 16 operatively connecting said pressure elements. The pressure head or element 14, as shown in Figures 1 and 2, includes a contact flange or plate 17 having a stem 18 projecting from one side thereof in substantially coaxial relation therewith. The stem 18 is provided with a centrally disposed threaded bore 19 extending inwardly from the outer end thereof in which is screw-threaded one end of the spindle 16. A lock nut 20 may, as shown in Figure 1, be screw-threaded on the spindle 16 for fixedly connecting the spindle to the pressure head or element 14 so that said head will rotate in unison with the spindle. The exterior of the shank is such that said shank will readily extend into or through the inner bearing race or cone 11 of the bearing 8 positioned adjacent the drive pinion head, while the diameter of the flange or plate 17 is such that it extends outwardly beyond the shank 18 for engagement with one end of the inner bearing race or cone 11 of the bearing 8 mounted adjacent the drive pinion.

The plate 17 may, as shown in Figures 1 and 2, be provided with a diametrically disposed slot or groove 22 which is of such a depth that the bottom wall 23 thereof is in the plane of the lower face 24 of the plate which contacts with the bearing cone 11. This groove is for the purpose of permitting the lower end of a spindle A of a micrometer depth gauge to contact with a surface of the pressure element 14 which is at the axis of the bearing 8 and in the plane of the upper or inner end of the bearing cone 11. This provides a means whereby the distance from the axis of rotation of the ring gear of the differential to the bearing 8 may be accurately made with a minimum amount of calculation.

The pressure element 15 is preferably, as shown in Figure 3, an annular plate having an exterior diameter less than the interior diameter of the end of the carrier C provided with the bearing seat 7 and greater than the diameter of the bore of the cone 11 of bearing 9 so as to contact with the outer end of said cone. The plate 15 is provided with a central opening 26 adapted to readily receive the spindle 16 therethrough. The plate 15 is maintained in contact with the cone 11 of bearing 9 by means of a nut 27 screw-threaded on the outer end of spindle 16 and a spring 28 mounted on the spindle intermediate the nut 27 and plate 15. The outer end of the spindle 16 is preferably provided with a squared or flattened portion 16' adapted to receive a wrench (not shown) whereby said spindle may be rotated. Furthermore, this portion 16' provides a convenient means by which the spindle may be maintained against rotation as the nut 27 is screw-threaded longitudinally of the spindle 16 for increasing or decreasing the tension of spring 28.

In operation, the bearings 8 and 9 are first mounted in the carrier with the cups 10 thereof inserted in their respective seats 6 and 7. The head 14 having the spindle 16 secured thereto is next assembled with the bearing 8 with the flange or plate 17 thereof contacting with the upper end of the cone 11, as illustrated in Figure 1. The disk or plate 15 may next be assembled with the lower or outer end of the spindle 16 and brought into contact with the outer end of the cone 11 of bearing 9. The spring 28 and nut 27 are then mounted on the spindle 16 and the nut turned in a direction to move the spring longitudinally of the spindle toward the plate 15 to bring the spring into engagement with said plate and to compress said spring to such an extent that a predetermined load will be placed thereon. This load is such that upon rotation of the spindle 16 and the pressure elements 14 and 15 connected therewith, the elements of each bearings 8 and 9 will be accurately and securely seated one with another, while the bearing cups 10 will be properly seated in the seats 6 and 7 respectively.

Rotation of the spindle 16 may be, as hereinbefore indicated, produced by applying a wrench or suitable tool to the end 16' of the spindle. After the bearings have thus been properly and accurately seated, the distance from the axis as X—X of the ring gear to the end of the cone 11 of bearing 8 adjacent said axis may be accurately measured with the aid of a suitable micrometer gauge. In obtaining this measurement, the end of a spindle A of a micrometer depth gauge is so placed on the surface 23 that said spindle extends substantially coaxially with the bearing and, therefore, at right angles to the axis X—X of the ring gear and the side bearing seats S. This enables the measurement to be quickly and accurately determined with a minimum amount of calculation. After the distance from the axis of the ring gear to the bearing 8 has thus been determined, the thickness of the shim required for maintaining the drive pinion in proper operating relation with the ring gear may be readily calculated by subtracting from this distance the sum obtained by adding the axial length of the pinion head and the distance the pinion is to be spaced from the axis of the ring gear, as determined by the manufacturer and stamped by said manufacturer on the pinion.

It is now evident that the proper seating of the bearings 8 and 9 obtained with the novel bearing seating instrument of this invention enables the thickness of the pinion adjusting shims to be readily and accurately determined. The bearing 8 is now removed from its seat and shims of proper thickness are mounted in the seat and the bearing returned to its proper position in said seat by aid of my bearing setting instrument in the manner hereinbefore described with the result that after the pinion and ring gear have been assembled in the carrier, the pinion will be in proper running relation with said ring gear.

In Figure 4, there is illustrated a modified form of the pressure element or head 14 which is adapted more particularly to enable the distance from the axis of rotation of the ring gear to the end of the pinion head adjacent said axis to be accurately measured prior to assembling the pinion and gear in the carrier. This pressure element or head, as 30, comprises a shank 31 adapted to extend into the bore of the cone 11 of bearing 8 and a flange 32 which extends outwardly from said shank for engagement with an end of the cone 11. Secured to or formed integral with the flange 32 is a rib 33 which extends diametrically across the outer surface of flange 32 so as to be readily contacted by the spindle, as A, of a micrometer gauge. The combined thicknesses of the rib 33 and flange 32 is equal to the axial length of the head of the drive pinion to be mounted in the bearing 8. It therefore follows that when the bearings 8 and 9 are properly seated when using a bearing seating instrument having the head 30, the distance from the axis of rotation of the ring gear to the head of the drive pinion may be accurately and readily obtained without assembling the pinion in the carrier.

Figures 5 and 6 illustrate a still further modified form of the invention. The pressure head 35 shown in Figures 5 and 6 is a rectangular plate having a central hole 36 which receives the upper end of the spindle 37 therein. The plate or head 35 is secured to the spindle 37 by a pin 38 so that the upper end of the spindle is substantially flush with the upper surface of the plate and provides a contact surface at the center of the head or plate spaced a predetermined distance from the lower face of the head or plate which contacts with the bearing cone 11 with which the spindle A of a measuring instrument may engage.

The width of the plate or head 35 is preferably less than the external diameter of bearing 8 engaged by said head or plate as shown in Figure 6 so that if desired the spindle A of the measuring instrument may be engaged directly with an exposed portion of the bearing 8 instead of with the plate or head 35 when measuring the distance from axis X—X of the ring gear or bearing seats S to the bearing 8.

Although the construction and operation of the bearing positioning device shown and above described are particularly simple, practical and economical, it is evident that various changes may be made in the detailed construction without departing from the spirit of the invention as set forth in the appended claim.

I claim:

An instrument for accurately setting the axially aligned drive pinion bearings of a differential gearing into their spaced seats with the inner one of said bearings arranged in predetermined spaced relation to the axis of the side bearing seats of said differential gearing, said instrument comprising, in combination, a spindle adapted to extend through said bearings, a pair of pressure members operatively carried by said spindle in spaced relation to each other longitudinally thereof for engaging the outer ends of said bearings, and means coacting with the spindle for urging said members toward each other and pressing the bearings into their seats, the pressure member nearest the side bearing seats of said differential gearing having a recess providing a bottom surface in the free side thereof, said recess being of a sufficient and accurate depth that said bottom surface thereof is in a plane of the inner contact surface of said pressure member and therefore in the plane of the adjacent end surface of the bearing it is adapted to contact, whereby a measuring instrument can be used in connection with said bottom surface to accurately determine the distance from said contact surface to the axis of the side bearing seats, when said pressure member is in contact with said end of said inner bearing, and in such manner to find the distance from said axis to the plane of said latter bearing end, for the purpose set forth.

RALPH L. DODGE.